Aug. 6, 1935.  J. C. BURTON  2,010,478
CORN KNIFE
Filed March 26, 1934
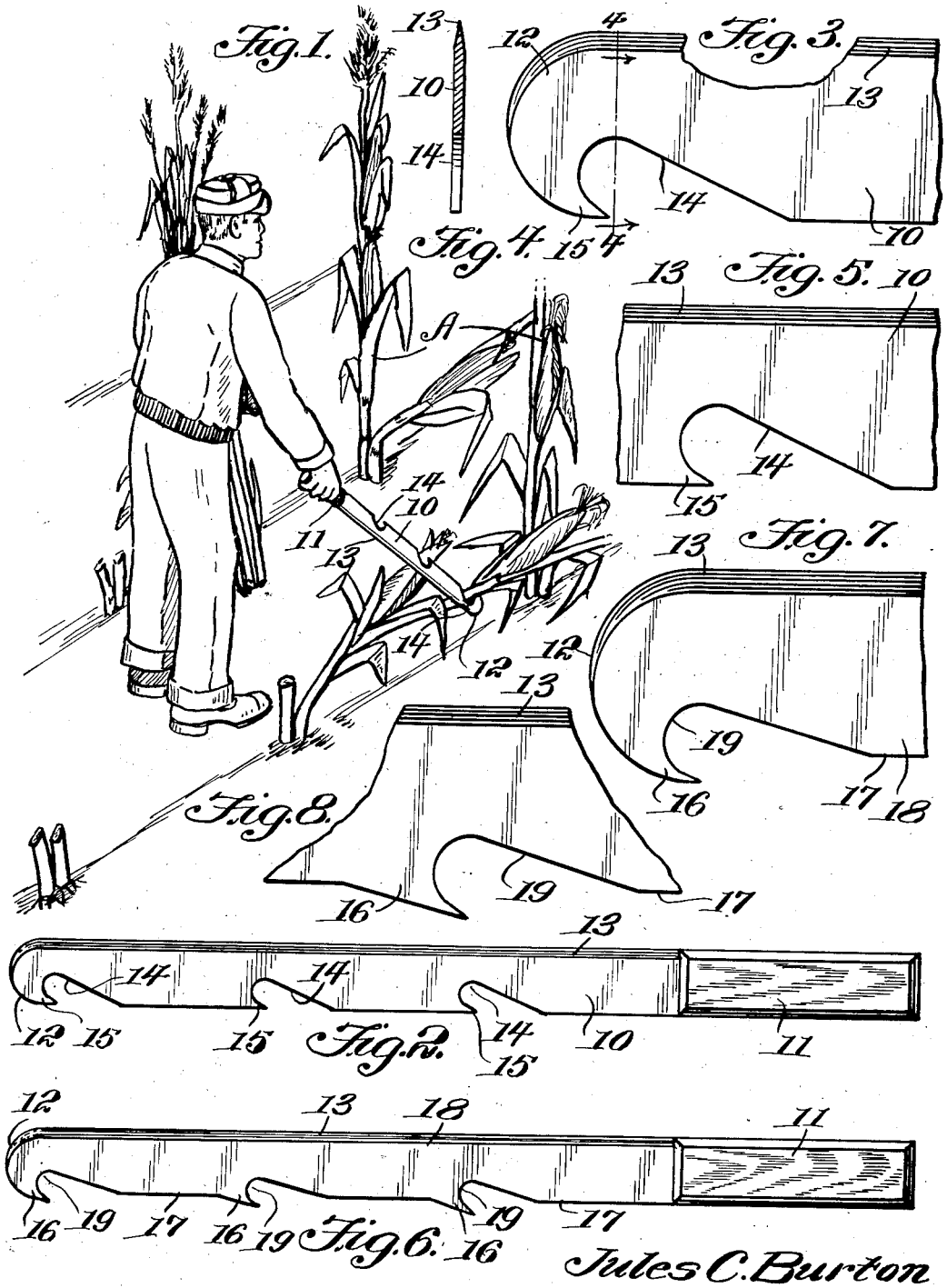
Jules C. Burton
INVENTOR
BY Victor J. Evans & Co.
ATTORNEY
WITNESS: J. T. L. Wright Patented Aug. 6, 1935

2,010,478

UNITED STATES PATENT OFFICE 2,010,478

CORN KNIFE

Jules C. Burton, Columbus, Ohio

Application March 26, 1934, Serial No. 717,483

1 Claim. (Cl. 30—9)

The invention relates to a corn knife and more especially to a corn stalk lifter and cutter.

The primary object of the invention is the provision of an implement of this character, wherein the cutting blade for the cutting of corn stalks has formed therein recesses presenting hooks, so that when a corn stalk has fallen or turned over, the same can be lifted by the user of the implement for the convenient cutting of the stalk and without necessitating such user stooping over for such purpose.

Another object of the invention is the provision of an article of this character, wherein at one side of a blade is formed a cutting edge and at the other side hooks, these being located at varying points throughout the extent of the blade so that fallen corn stalks may be conveniently lifted by the user of the implement and such stalks cut with dispatch, without such user bending over either at the time of raising or lifting the stalks or the cutting thereof and thus enabling the corn stalk cutting to be carried forth expeditiously and with minimum exertion on the part of the user of the implement.

A further object of the invention is the provision of an article of this character which is extremely simple in its construction, thoroughly reliable and efficient in its purpose, strong, durable, readily and easily handled, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a pictorial view showing the implement constructed in accordance with the invention held by a user and in position for the lifting of a fallen corn stalk.

Figure 2 is a side elevation of the implement.

Figure 3 is an enlarged fragmentary side view showing the hook formation of the blade at its free extremity.

Figure 4 is a sectional view on the line 4—4 of Figure 3 looking in the direction of the arrows.

Figure 5 is a view similar to Figure 3 showing another of the hook formations in the blade of the implement intermediate of its ends.

Figure 6 is a side elevation showing a slight modification.

Figure 7 is an enlarged fragmentary side elevation showing the modified hook formation at the free end of the blade.

Figure 8 is a view similar to Figure 7 showing another of the hook formations in the modified form.

Similar reference characters indicate corresponding parts through the several views in the drawing.

Referring to the drawing in detail, particularly Figures 1 to 5 inclusive, the implement comprises a flat straight blade 10 of uniform width throughout its extent and fitted at one end with a handle 11, while the opposite free end is rounded, at 12, and at one long side of the said blade is a beveled cutting edge 13, the same being extended into the rounded free end portion 12 for a distance. This edge 13 serves to cut corn stalks A illustrated in Figure 1.

At the heel side of the blade 10 are provided the diagonally disposed notches or recesses 14, these being spaced the required distance from each other, and the outermost of the same being located close to the free rounded end 12 of said blade. The notches or recesses 14 open through the hollow edge of the blade 10 and provide the hook-like bills 15 at this edge, the purpose of the notches or recesses 14 being to hook a fallen corn stalk so that the same can be lifted by the implement for the convenient cutting of such stalk without necessitating bending over of the user of the implement, and the use of such implement being clearly disclosed in Figure 1 of the drawing.

The spacing of the notches or recesses 14 assures a maximum range for engagement of a fallen or turned-over corn stalk without necessitating the stooping or bending over of the user of the implement when desiring to lift such fallen stalk.

In Figures 6, 7 and 8 of the drawing there is shown a slight modification, wherein the hook bills 16 are turned outwardly to protrude beyond the edge 17 of the blade 18 in contradistinction to the bills 15 being flush with said edge, as is shown in Figures 1 to 5 inclusive, and this enables a more positive engagement of the corn stalk by the blade 18 to have such stalk seat within the notches or recesses 19 as provided in said blade 18.

The diagonal disposition of the notches or recesses 14 and 19 is in the direction of the rounded free end of the blade of the implement, so that a positive hooking action is assured in the use of the implement for the lifting of fallen or drooping corn stalks.

What is claimed is:

An implement of the kind described comprising a flat elongated blade having a rounded end and straight heel and cutting edges, the heel edge being diagonally slitted to provide hook formations inwardly of the blade at considerable distances from each other throughout its length and having bills complementing the heel edge directed toward a holding end of said blade, one of the hook formations being located close to the rounded end of the blade.

JULES C. BURTON.